(12) United States Patent
Hanumalagutti et al.

(10) Patent No.: US 10,097,066 B2
(45) Date of Patent: Oct. 9, 2018

(54) ELECTRIC MACHINE FOR VEHICLE

(71) Applicant: Ford Global Technologies, LLC, Dearborn, MI (US)

(72) Inventors: Prasad Dev Hanumalagutti, Dearborn, MI (US); Michael W. Degner, Novi, MI (US); Franco Leonardi, Dearborn Heights, MI (US); Edward Chan-Jiun Jih, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 15/072,716

(22) Filed: Mar. 17, 2016

(65) Prior Publication Data

US 2017/0271956 A1 Sep. 21, 2017

(51) Int. Cl.
| | |
|---|---|
| *H02K 9/197* | (2006.01) |
| *H02K 9/19* | (2006.01) |
| *H02K 1/20* | (2006.01) |
| *H02K 3/12* | (2006.01) |
| *H02K 5/15* | (2006.01) |
| *H02K 5/20* | (2006.01) |

(52) U.S. Cl.
CPC .............. *H02K 9/19* (2013.01); *H02K 1/20* (2013.01); *H02K 3/12* (2013.01); *H02K 5/15* (2013.01); *H02K 5/20* (2013.01)

(58) Field of Classification Search
CPC ............ H02K 9/19; H02K 9/197; H02K 1/20; H02K 3/24
See application file for complete search history.

(56) References Cited

U.S. PATENT DOCUMENTS

| 2,975,309 | A | * | 3/1961 | Seidner | .................. H02K 9/197 |
|---|---|---|---|---|---|
| | | | | | 174/DIG. 20 |
| 3,995,181 | A | * | 11/1976 | Suit | ......................... H02K 3/24 |
| | | | | | 165/104.19 |
| 4,413,201 | A | * | 11/1983 | Nikitin | ................... H02K 9/197 |
| | | | | | 310/214 |
| 5,845,389 | A | | 12/1998 | Roberts et al. | |
| 6,211,587 | B1 | | 4/2001 | Enomoto et al. | |
| 6,300,693 | B1 | | 10/2001 | Poag et al. | |
| 6,407,474 | B1 | | 6/2002 | Mahn et al. | |
| 6,452,294 | B1 | | 9/2002 | Vandervort et al. | |
| 6,727,611 | B2 | | 4/2004 | Bostwick | |

(Continued)

*Primary Examiner* — Dang Le
(74) *Attorney, Agent, or Firm* — David B. Kelley; Brooks Kushman P.C.

(57) ABSTRACT

An electric machine for a vehicle includes a stator having slots and a yolk region defining a plurality of channels extending between the opposing end faces of the stator. Windings extend through the slots and have end windings adjacent to the end faces. A rotor is disposed within the stator. The electric machine also includes first and second annular covers each defining a cavity having a plurality of walls partitioning the cavity into a plurality of cooling chambers that are circumferentially isolated from each other. Each of the covers is attached to one of the end faces such that a corresponding one of the end windings is disposed within one of the cavities, and such that each of the channels is in direct fluid communication with a corresponding one of the cooling chambers of the first cover and with a corresponding one of the cooling chambers of the second cover.

20 Claims, 9 Drawing Sheets

(56) References Cited

U.S. PATENT DOCUMENTS

| | | |
|---|---|---|
| 6,787,950 B2 | 9/2004 | Heim |
| 6,856,053 B2 | 2/2005 | LeFlem et al. |
| 7,157,818 B2 | 1/2007 | Jones |
| 7,538,457 B2 | 5/2009 | Holmes et al. |
| 7,566,999 B2 | 7/2009 | Neal |
| 7,675,209 B2 * | 3/2010 | Masoudipour ........... H02K 5/20 |
| | | 310/57 |
| 7,692,356 B2 | 4/2010 | Bott et al. |
| 7,768,166 B2 | 8/2010 | Lafontaine et al. |
| 7,928,348 B2 | 4/2011 | Neal |
| 7,952,240 B2 * | 5/2011 | Takenaka ................. H02K 1/20 |
| | | 310/260 |
| 8,080,908 B2 | 12/2011 | Matsubara et al. |
| 8,080,909 B2 | 12/2011 | Perkins |
| 8,138,640 B2 | 3/2012 | Urano et al. |
| 8,405,262 B1 | 3/2013 | Beatty et al. |
| 8,766,497 B2 | 7/2014 | Goto et al. |
| 8,963,384 B2 | 2/2015 | Kirkley, Jr. et al. |
| 2008/0042498 A1 | 2/2008 | Beer |
| 2008/0042502 A1 | 2/2008 | VanLuik et al. |
| 2008/0143203 A1 | 6/2008 | Purvines et al. |
| 2010/0045125 A1 | 2/2010 | Takenaka et al. |
| 2011/0215660 A1 | 9/2011 | Goto et al. |
| 2012/0032543 A1 | 2/2012 | Chakraborty et al. |
| 2012/0062056 A1 | 3/2012 | Bradfield |
| 2012/0091838 A1 | 4/2012 | Miyamoto et al. |
| 2012/0242178 A1 | 9/2012 | Miyamoto et al. |
| 2013/0342049 A1 | 12/2013 | Stridsberg |
| 2014/0265663 A1 | 9/2014 | Chamberlin et al. |
| 2014/0265670 A1 | 9/2014 | Chamberlin et al. |
| 2014/0354090 A1 | 12/2014 | Chamberlin |
| 2015/0217632 A1 | 8/2015 | Lebeau et al. |
| 2015/0280525 A1 | 10/2015 | Rippel et al. |
| 2015/0280526 A1 | 10/2015 | Chamberlin et al. |
| 2017/0025911 A1 | 1/2017 | Jewell et al. |

* cited by examiner

ELECTRIC MACHINE FOR VEHICLE

TECHNICAL FIELD

The present disclosure relates to electric machines, for use with electric and hybrid-electric vehicles, that are capable of acting either as a motor or as a generator.

BACKGROUND

Vehicles such as battery-electric vehicles and hybrid-electric vehicles contain a traction-battery assembly to act as an energy source. The traction-battery assembly, for example, is electrically connected to an electric machine that provides torque to driven wheels. The traction-battery assembly may include components and systems to assist in managing vehicle performance and operations. It may also include high-voltage components, and an air or liquid thermal-management system to control temperature.

Electric machines typically include a stator and a rotor that cooperate to convert electrical energy into mechanical motion or vice versa. Electric machines may include thermal-management systems to cool the stator, rotor, or both.

SUMMARY

According to one embodiment, an electric machine for a vehicle includes a stator having slots and a yolk region defining a plurality of channels extending between the opposing end faces of the stator. Windings extend through the slots and have end windings adjacent to the end faces. A rotor is disposed within the stator. The electric machine also includes first and second annular covers each defining a cavity having a plurality of walls partitioning the cavity into a plurality of cooling chambers that are circumferentially isolated from each other. Each of the covers is attached to one of the end faces such that a corresponding one of the end windings is disposed within one of the cavities, and such that each of the channels is in direct fluid communication with a corresponding one of the cooling chambers of the first cover and with a corresponding one of the cooling chambers of the second cover.

According to another embodiment, an electric machine includes a stator having cooling channels extending between opposing ends of the stator, and end windings adjacent to the ends. A cover defines a cavity and has walls partitioning the cavity into compartmentalized cooling chambers. Each of the walls defines a cutout that receives a portion of a corresponding one of the end windings therein, and each channel is in direct fluid communication with one of the chambers.

According to yet another embodiment, an electric machine includes a stator having opposing ends and a slot extending therebetween. The stator also includes windings having end windings adjacent to the ends. A portion of the windings extend through the slot such that a cooling channel is defined between the windings and a periphery of the slot. A cover defines a cavity and receives one of the end windings therein. The cover has walls defining compartmentalized cooling chambers within the cavity. The channel is in direct fluid communication with one of the chambers.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
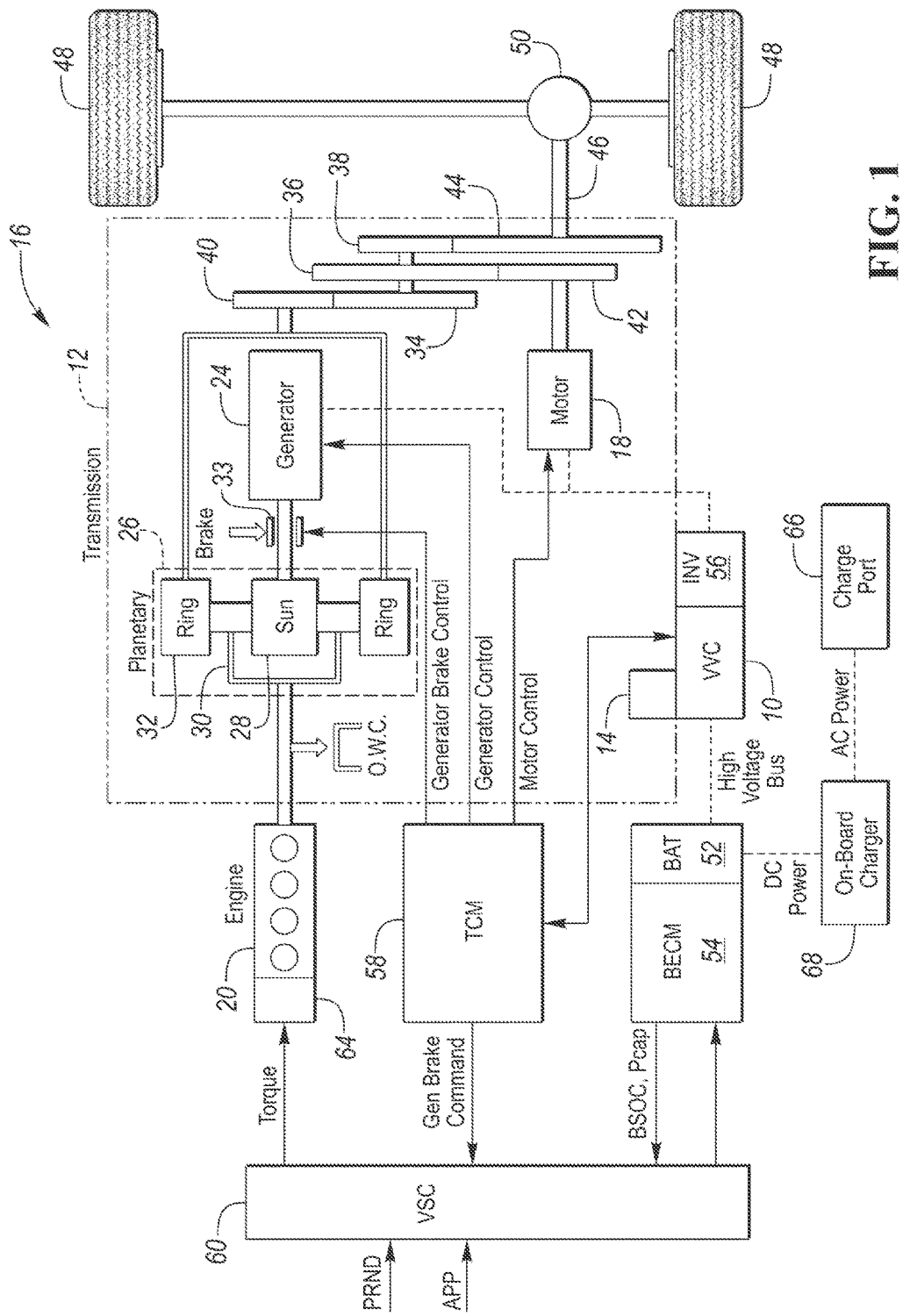
FIG. 1 is a schematic diagram of an example hybrid vehicle.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
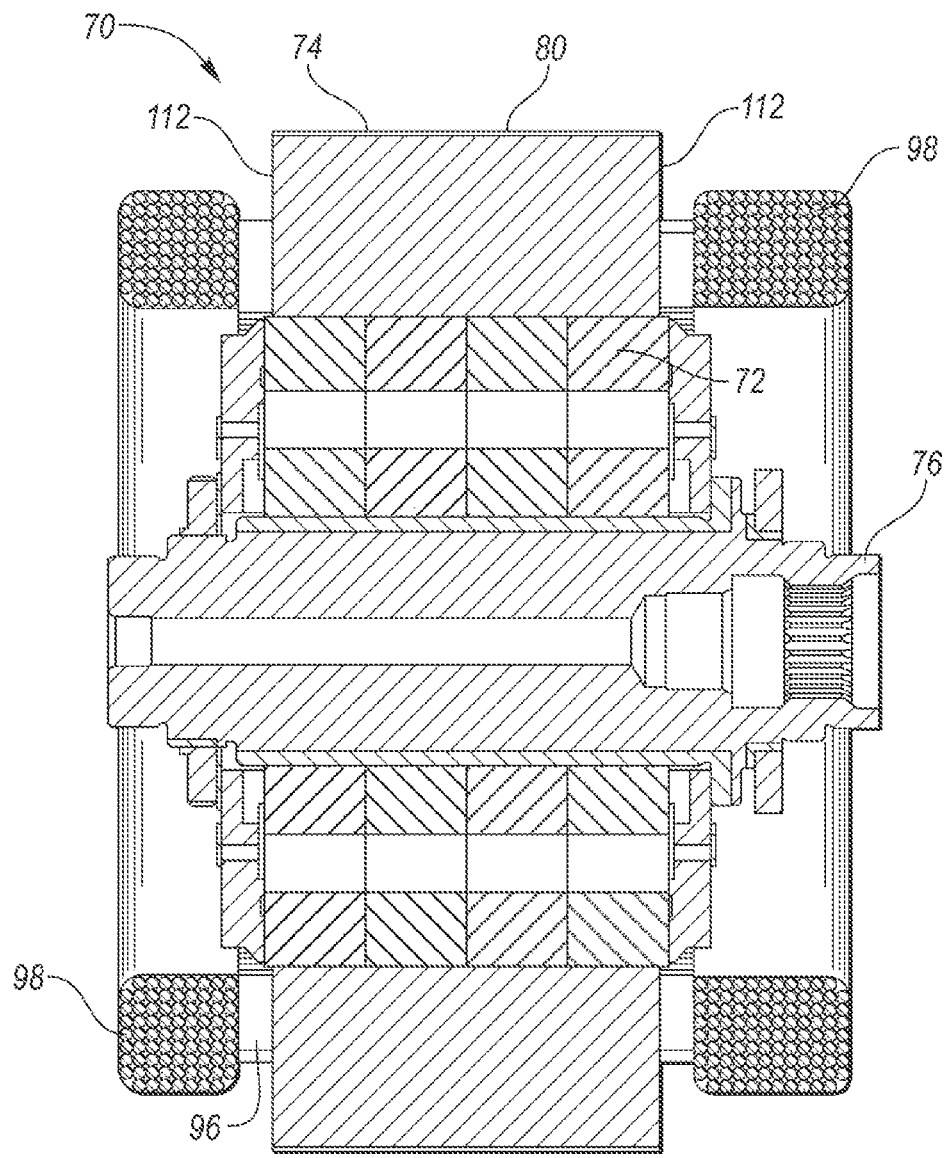
FIG. 2 is a side view, in cross section, of a portion of an example electric machine.
Figure 3:
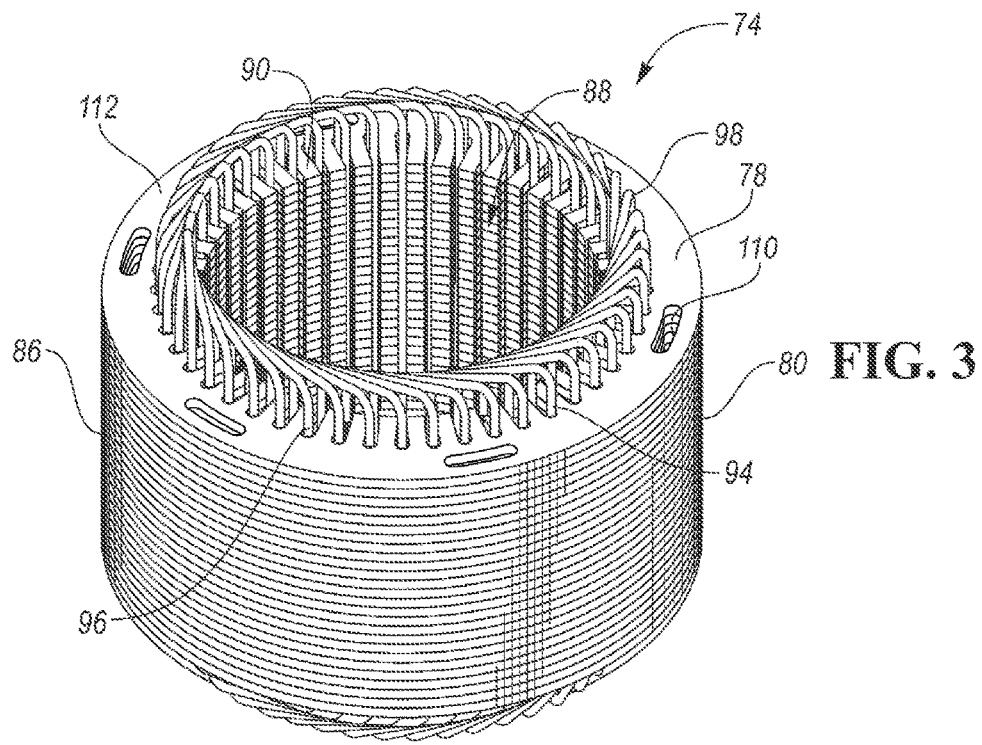
FIG. 3 is a perspective view of a stator of the electric machine of FIG. 2.
Figure 4:
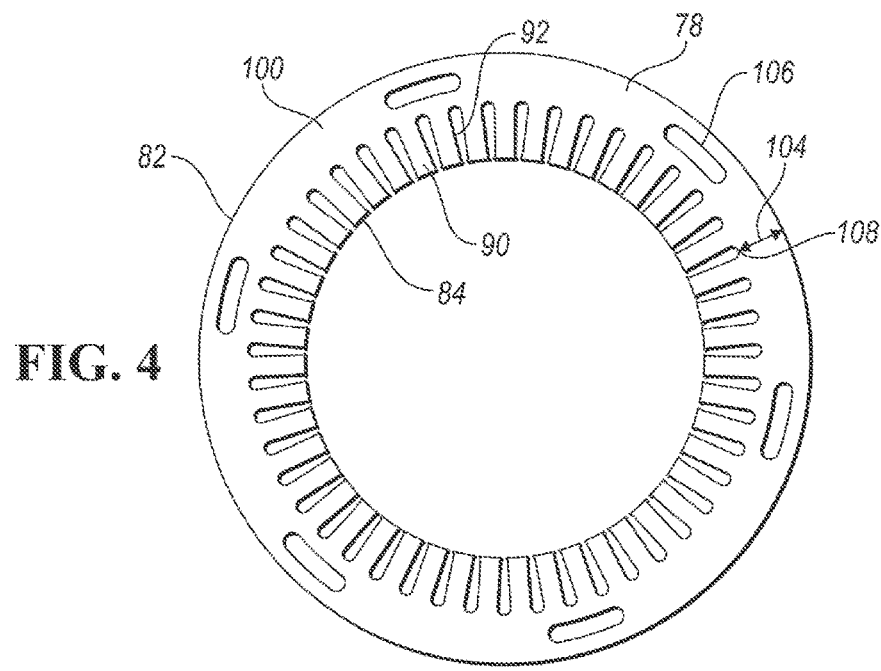
FIG. 4 is a top view of a lamination of the stator shown in FIG. 3.

Referring to FIGS. 2, 3, and 4 an example electric machine 70 includes a stator 74 having a plurality of laminations 78. Each of the laminations 78 includes a front side 100 and a back side opposite the front. When stacked, the front and back sides are disposed against adjacent front and back sides to form a stator core 80. Each of the laminations 78 may be doughnut shaped and may define a hollow center. Each lamination 78 also includes an outer diameter 82 and an inner diameter 84. The outer diameters 82 cooperate to define an outer surface 86 of the stator core 80, and the inner diameters 84 cooperate to define a cavity 88.

Each lamination 78 includes a plurality of teeth 90 extending radially inward toward the inner diameter 84. Adjacent teeth 90 cooperate to define slots 92. The teeth 90 and the slots 92 of each lamination 78 are aligned with adjacent laminations to define stator slots 94 extending through the stator core 80 between the opposing end faces 112. The end faces 112 define the opposing ends of the core 80 and are formed by the first and last laminations of the stator core 80. A plurality of windings (also known as coils, wires, or conductors) 96 are wrapped around the stator core 80 and are disposed within the stator slots 94. The windings 96 may be disposed in an insulating material (not shown). Portions of the windings 96 generally extend in an axial direction along the stator slots 94. At the end faces 112 of the stator core, the windings 96 bend to extend circumferentially around the end faces 112 of the stator core 80 forming the end windings 98. While shown as having distributed windings, the windings could also be of the concentrated type.

A rotor 72 is disposed within the cavity 88. The rotor 72 is fixed to a shaft 76 that is operably connected to the gearbox. When current is supplied to the stator 74, a magnetic field is created causing the rotor 72 to spin within the stator 74 generating a torque that is supplied to the gear box via one or more shafts.

Each of the laminations 78 may also include a yoke region 104 defined between the outer diameter 82 and a valley 108 of the slots 92. A plurality of fluid apertures 106 may be defined in the yolk region 104 of each of the laminations 78. The apertures 106 extend between the front side 100 and the backside providing a void completely through the lamination 78. The apertures 106 may be slots (as shown) or may be another shape. When stacked, the apertures 106 of each lamination 78 are aligned with adjacent laminations to define cooling channels 110 extending through the stator core 80 between the end faces 112. The example lamination 78 is shown to have six apertures, however, the present disclosure contemplates having greater or fewer than six apertures per lamination.

During operation, the electric machine 70 generates heat within the stator core 80 and the windings 96. To prevent overheating of the electric machine, a fluid circuit may be provide to remove heat generated during operation.

Figure 5:
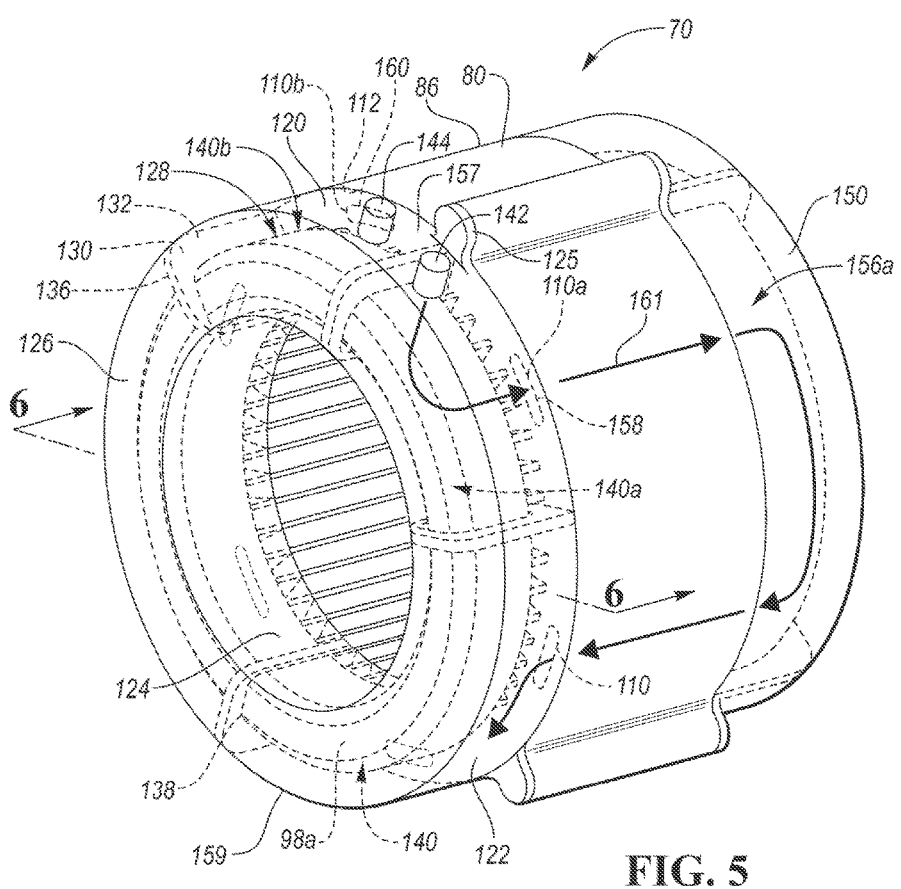
FIG. 5 is a front perspective view of an electric machine.
Figure 6:
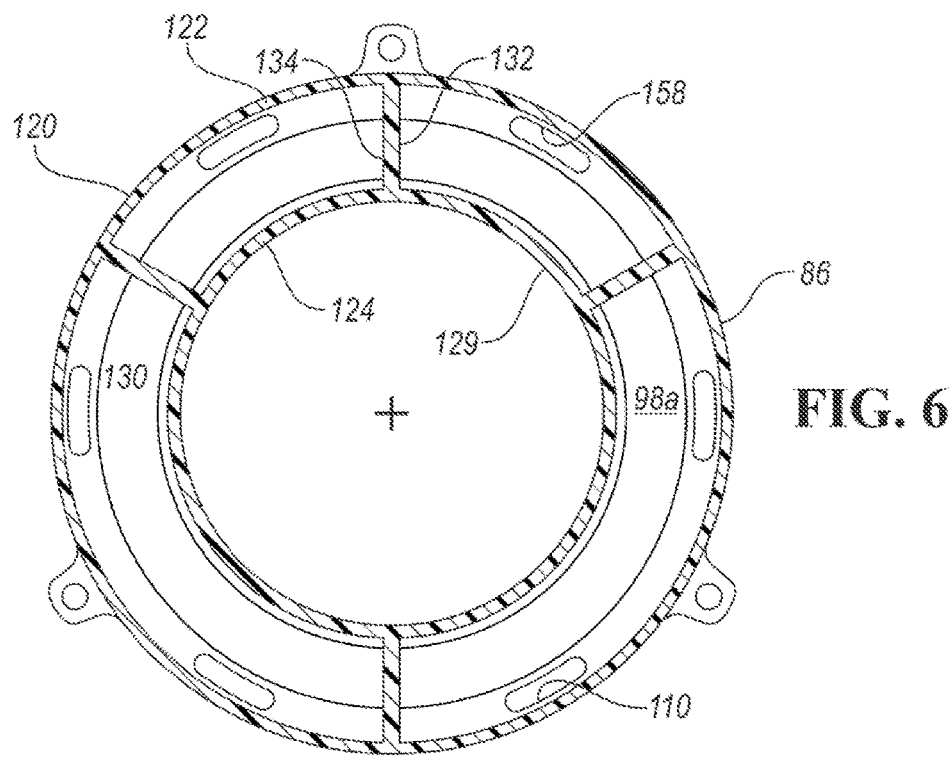
FIG. 6 is a front view, in cross section, along cut line 6-6.

Referring to FIGS. 5 and 6, the electric machine 70 may include a first annular cover 120 disposed over the lead-side end windings 98*a*. The cover defines a cooling chamber for cooling the end windings 98*a* (schematically shown as a solid ring) as we described below in more detail. The cover 120 may include an outer wall 122, an inner wall 124, and an adjoining wall 126 connecting the inner and outer walls.

The cover 120 may be sized such that the outer wall 122 is near the outer surface 86 of the stator core 80, and the inner wall 124 is near the inner surface 129 of the stator core 80 when the cover 120 is installed on the end face 112 of the stator core 80. The cover 120 may include tabs 125 that attach to the stator core to secure the cover onto the stator. The walls 122, 124, 126 cooperate to define a cavity 128. A plurality of partitioning walls 130 are disposed within the cavity 128 to divide the cavity into a plurality of compartmentalized cooling chambers 140. Each of the cooling chambers 140 are circumferentially isolated from each other by the partitioning walls 130. Used herein "isolated" does not mean perfect, or complete isolation. The seal between the portioning walls and the winding may not be perfect and some fluid may leak from one cooling chamber to another. Despite this potential leaking, circumferentially isolated chambers are still capable of having different pressures sufficient to create fluid flow through the system.

Each of the walls 130 includes a first major side 132, a second major side 134 and minor sides 136 extending between the major sides. The major sides are the surfaces that define the cooling chambers 140 and the minor sides are the short sides that connect with the cover 120. For each partitioning wall 130, the first major side 132 is part of one of the coolant chambers 140 and the second major side 134 is part of another of the cooling chambers 140. Each of the partitioning walls 130 defines a cutout 138 configured to receive a portion of the end winding 98*a* and the winding 96 when the cover 120 is installed on the stator core 80. The cutout 138 is sized to form a fairly tight fit around the end windings to prevent oil from flowing through wall 130 and the windings. Rubber or other similar material may be applied around the cutout 138 to facilitate sealing with the windings. In some embodiments, the outer sidewall 122, the inner sidewall 124, and the adjoining wall 126 are integrally formed. In one embodiment, the partitioning walls 130 are also integrally formed with the other components of the cover 120. The partitioning walls 130 may be made of a flexible material allowing the partitioning wall to elastically deform making it easier to insert the end winding 98*a* into the cutout 138. The cover 120 may be made of plastic or metal.

Figure 8:
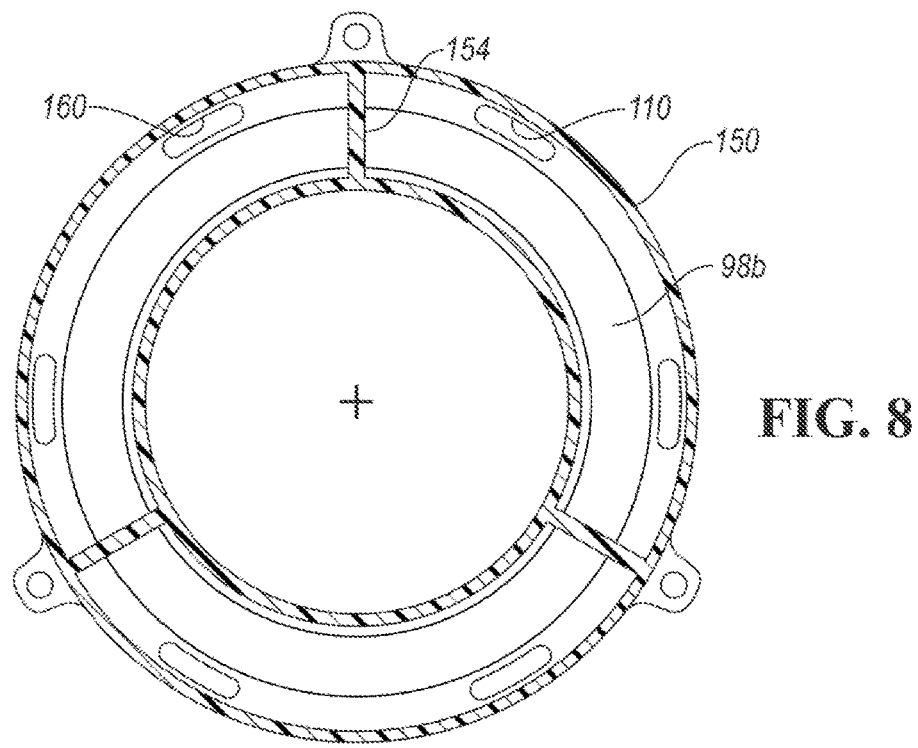
FIG. 8 is a rear view, in cross section, along cut line 8-8.
Figure 7:
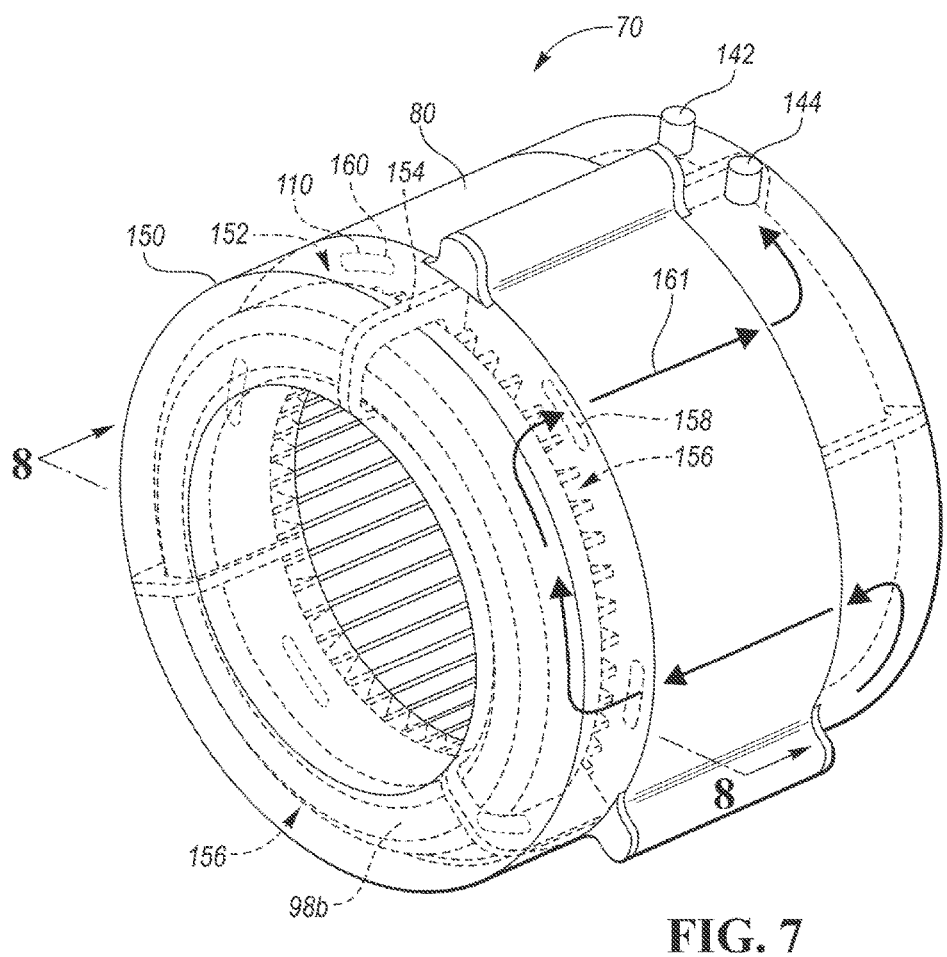
FIG. 7 is a rear perspective view of the electric machine shown in FIG. 5.

Referring to FIGS. 7 and 8, the electric machine 70 also includes a second annular cover 150 disposed over the anti-lead-side end winding 98*b*. The second cover 150 may be similar to the first cover 120. For example, the second cover 150 includes a cavity 152 having partitioning walls 154 that divide the cavity into a plurality of compartmentalized coolant chambers 156. The first cover 120 may include more or less cooling chambers 140 than the second cover 150. In the illustrated embodiment, the first cover 120 includes four cooling chambers 140, and the second cover 150 includes three cooling chambers 156. As such, the first cover 120 includes four partitioning walls 130, and the second cover includes three partitioning walls 154. The number of walls and chambers shown are merely an example. This disclosure contemplates other embodiments having a different number of walls and chambers.

Referring to FIGS. 5 through 8, the cooling channels 110 connect the cavity 128 in fluid communication with the cavity 152 allowing fluid to flow from one of the cavities to the other. Each of the cooling chambers 140, 156 are in fluid communication with at least one of the cooling channels 110. In the illustrated embodiment, some of the cooling chambers 140, 156 are in fluid communication with one channel 110 and some of cooling chambers 140, 156 are in fluid communication with two channels 110. Each of the cooling channels 110 includes an inlet port 158 that opens into one of the cooling chambers, and an outlet port 160 that opens into another of the cooling chambers.

In the illustrated example embodiment, each cooling chamber 140, 156 is in direct fluid communication with at least one cooling channel, but in other embodiments, each cooling chamber may be in direct fluid communication with multiple cooling channels. Direct fluid communication means that fluid immediately enters one of the components when exiting the other of the components, or vice versa. More illustratively, channel 110b is in direct fluid communication with chamber 140b as fluid exiting through port 160 of channel 110b immediately flows into chamber 140b.

The cooling chambers 140, 156 and the cooling channels 110 cooperate to define a fluid circuit 161 (partially illustrated by arrows) that cools the windings 96 and the stator core 80. The fluid circuit 161 may circulate oil (such as transmission fluid) or any other suitable heat transfer liquid. The fluid circuit 161 may be a series circuit (as shown), or a parallel circuit. In the illustrated embodiment, the first cover 120 defines an inlet port 142 and an outlet port 144. The inlet port 142 and the outlet port 144 open into different cooling chambers 140. The fluid enters into the first cooling chamber 140a via the inlet port 142. Then, fluid flows through the first cooling channel 110a and into the second cooling chamber 156a. The fluid continues to serpentine through the electric machine 70 until the fluid flows into the last cooling chamber 140b and out the outlet port 144. The inlet and outlet ports 142, 144 may be configured to connect with fluid supply and return passages of a transmission as will be described in more detail below. In other embodiments, the inlet port 142 is defined in the first cover 120 and the outlet port is defined and the second cover 150. The inlet port 142 and the outlet port 144 may be located at the top 157 of the cover 120, at the bottom 159 of the cover, on a side of the cover, or any combination thereof.

Figure 9A:
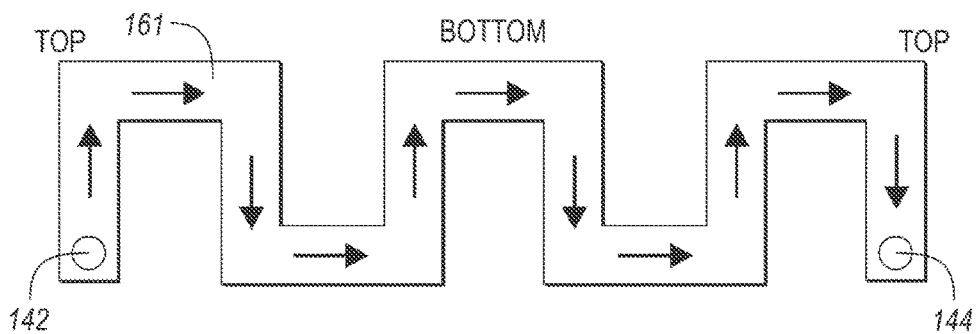
FIG. 9A is a diagrammatical view of an example flow path for the cooling medium through the electric machine.
Figure 9B:
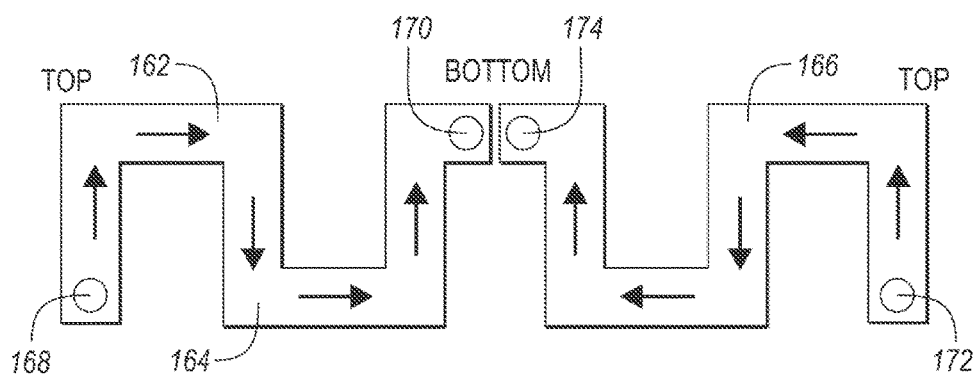
FIG. 9B is a diagrammatical view of another example flow path for the cooling medium through the electric machine.
Figure 9C:
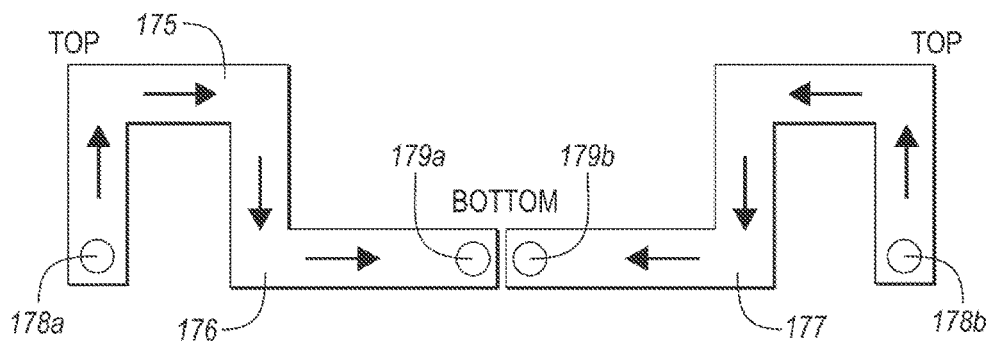
FIG. 9C is a diagrammatical view of yet another example flow path for the cooling medium through the electric machine.

FIGS. 9A through 9C illustrate example fluid circuits for the electric machine 70. FIG. 9A is the fluid circuit 161 shown in FIGS. 5 and 7. FIG. 9B shows another cooling configuration 162 that has a first series fluid circuit 164 and a second series fluid circuit 166. The first circuit 164 is on one half of the stator and the second circuit 166 is on the other half of the stator. For example, the first circuit 164 is on the left longitudinal side and includes an inlet port 168 defined in the first cover near the top of the cover, and includes an outlet port 170 defined in the second cover near the bottom of the cover. The second circuit 166 is on the right longitudinal side and includes an inlet port 172 defined in the first cover near the top of the cover, and includes an outlet port 174 defined in the second cover near the bottom of the cover. FIG. 9C illustrates yet another cooling configuration 175 that has a first series fluid circuit 176 and the second series fluid circuit 177. Cooling configuration 175 is similar to configuration 162, except all of the inlet ports 178 and all of the outlet ports 179 are located in a same cover.

Figure 10:
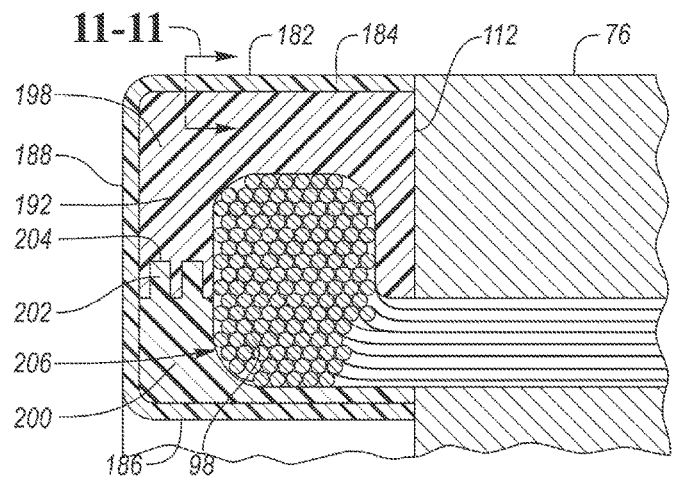
FIG. 10 is side view, in cross section, of a portion of an example cover attached to an electric machine.
Figure 11:
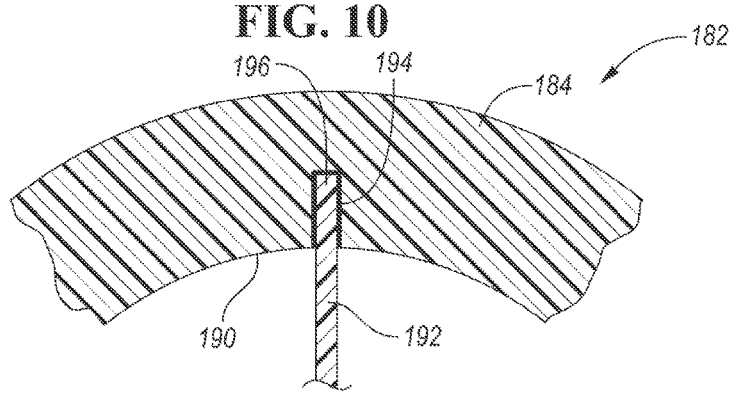
FIG. 11 is a front view, in cross section, of the cover shown in FIG. 10 along cut line 11-11.

All of the components of the annulus covers may be integrally formed in some embodiments. In other embodiments, only some of the components of the cover are integrally formed. Referring to FIGS. 10 and 11, a cover 182 according to another embodiment is shown. The cover 182 is similar to cover 120 and includes an outer sidewall 184, an inner sidewall 186, and an adjoining wall 188. The walls cooperate to define a cavity that receives the end winding 98 therein when the cover 182 is installed on the end face 112 of the stator 74. In this embodiment, the outer sidewall 184, inner sidewall 186, and adjoining wall 188 may be integrally formed. But, unlike some of the embodiments, the partitioning wall 192 is not integrally formed with the other portions of the cover 182. Instead, the inner surface 190 of the cover 182 may define grooves 194 that each receive an edge portion 196 of the partitioning wall 192 to locate the walls 192 to the cover 182. Adhesive may be applied in the grooves to form a permanent bond between the cover and walls. In other embodiments, the walls may be secured to the cover via any means known to a person having ordinary skill in the art including snaps, pins, fasteners, clips, or the like.

In some embodiments, the partitioning wall 192 may include a first piece 198 and a second piece 200. The first piece 198 may extend radially inward from the outer sidewall 184 toward the outer portion of the end windings 98. The second piece 200 extends radially outward from the inner sidewall 186 towards the first piece. The first and second piece 198, 200 may be joined together via a mechanical connection, with adhesive, or both. For example, the first and second pieces may define guild members that cooperate to secure the first piece to the second piece. In one embodiment, the first piece 198 may define sleeves 204 that receive pins 202 of the second piece 200. The pins and sleeves may include a snap feature. The first and second pieces 198, 200 cooperate to define a cutout 206 that receives the end winding 98 therein. For example, the first piece 198 defines an outer portion of the cutout 206, and the second piece 200 defines an inner portion of the cutout. Having partitioning walls 192 with multi-piece construction allows the partitioning walls to be made of a more rigid material and allows the cutouts to have a tighter fit with the end windings.

Figure 12:
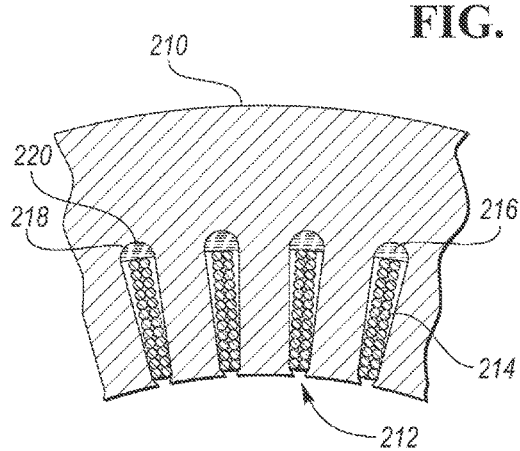
FIG. 12 is a front view, in cross section, of an electric machine according to an alternative embodiment.

The cooling channels may be defined through areas of the stator core other than the yoke region. For example, the cooling channels may extend through the stator slots. Referring to FIG. 12, a stator 210 includes a plurality of slots 212 extending between the end faces of the stator core, as shown in FIG. 3 for example. The windings 214 extend through each of the slots 212. The slots are sized such that a cooling channel 216 is defined between a periphery 218 of the slot and the winding 214. The coolant channel 216 may be located at the valley 220 of the slot 212. The windings 214 may be wrapped in an insulating sleeve (not shown). If the sleeve is included, the coolant channels are defined between the slot and the sleeve. In some embodiments, the cooling channel 216 may be defined by a conduit that extends through the slots.

Figure 13:
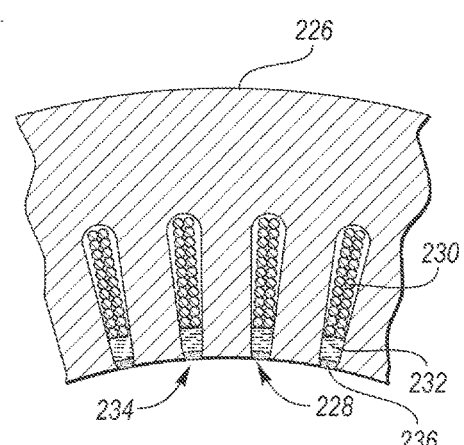
FIG. 13 is a front view, in cross section, of an electric machine according to yet another embodiment.

Referring to FIG. 13, another stator 226 includes a plurality of slots 228 extending between the end faces of the stator core. Windings 230 extend through each of slots 228. The slots are sized such that a coolant channel 232 also extends therethrough. The coolant channel 232 may be defined by the cooperation of the slots 228 and the windings 230, or a physical conduit may extend through the slots to form the boundaries of the coolant channel 232. In embodiments where a conduit is not used, a seal 236 may be placed in the entrance area 234 to close the slots 228. Each of the coolant channels 232 are defined between the periphery of the slots 228, the inner surface of the seal 236, and the windings 230. If a conduit is used, the conduit may be placed in the entrance area 234 between the entrance of the slot and the windings 230, and the seal may be omitted.

Figure 14:
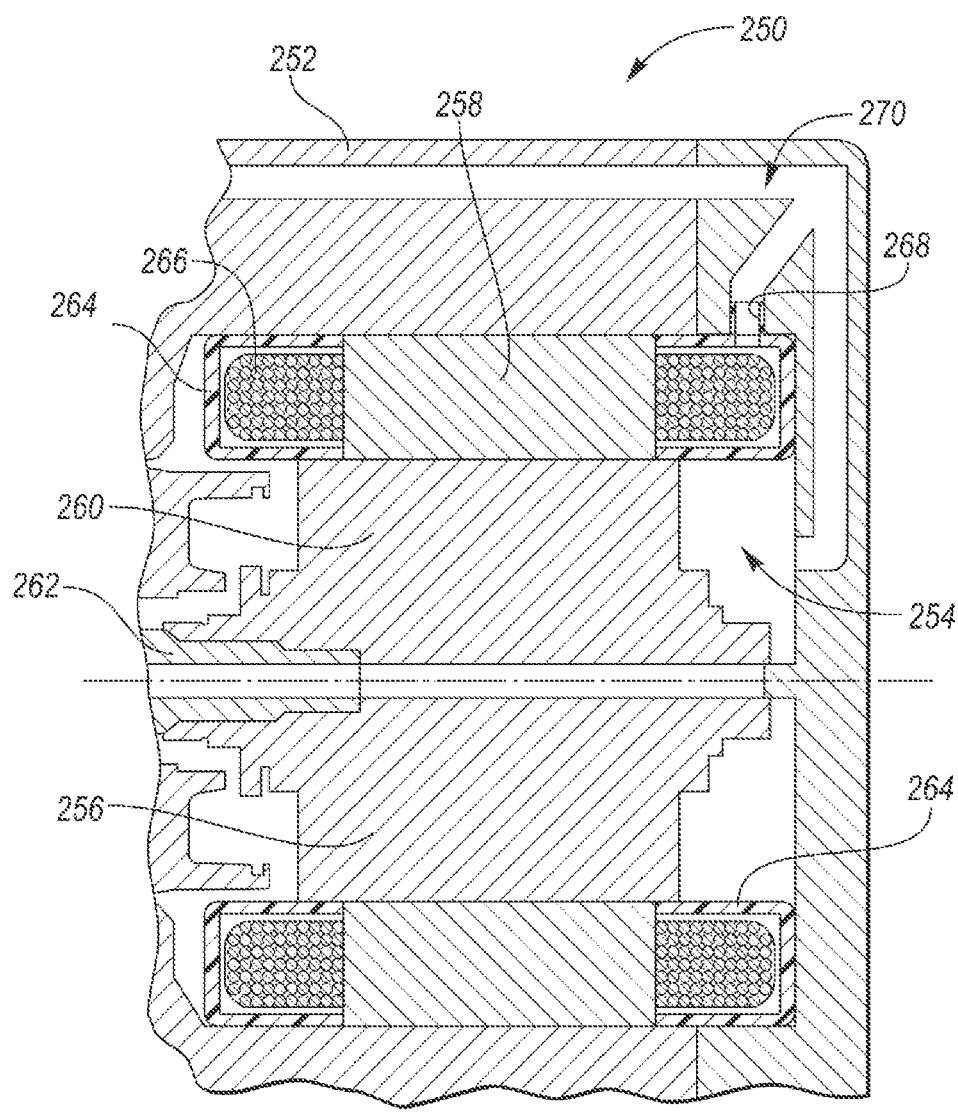
FIG. 14 is a side view, in cross section, of a portion of a transmission.

Referring to FIG. 14, a hybrid transmission 250 includes a housing 252 defining a cavity 254. An electric machine 256 (which may be the same or similar to electric machine 70) is supported within the cavity 254. The electric machine 256 includes a stator 258 that is mounted to the housing 252 such that the stator is unable to rotate relative to the housing 252. The rotor 260 is disposed within the stator and is fixed (e.g., splined) to a shaft 262. The shaft 262 may connect to the gear box. The electric machine includes a pair of annular covers 264 (same or similar to covers 120, 150) connected to the stator 258 to form cooling cavities around the end windings 266. At least one of the covers includes a port 268 that is in fluid communication with one or more passageways 270 defined in the housing 252. The passageways 270 may be in fluid communication with the valve body of the transmission 250 and are configured to convey oil to the cooling cavities to cooling the electric machine 256. The covers may also be in fluid communication with other passageways (not shown) to return oil to the valve body, or to convey oil to the sump.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine for a vehicle comprising:
   a stator including slots and a yolk region defining a plurality of channels extending between opposing end faces;
   windings extending through the slots and including end windings adjacent the end faces;
   a rotor disposed within the stator; and
   first and second annular covers each defining a cavity having a plurality of walls partitioning the cavity into a plurality of cooling chambers that are circumferentially isolated from each other, wherein each of the covers is attached to one of the end faces such that a corresponding one of the end windings is disposed within one of the cavities, and such that each of the channels is in direct fluid communication with a corresponding one of the cooling chambers of the first cover and with a corresponding one of the cooling chambers of the second cover.

2. The electric machine of claim 1 wherein each of the walls defines a cutout, and at least a portion of a corresponding one of the end windings is disposed within the cutout.

3. The electric machine of claim 1 wherein the first cover has more cooling chambers than the second cover.

4. The electric machine of claim 1 wherein the first cover includes an inner surface defining a groove that receives an edge portion of one of the walls.

5. The electric machine of claim 1 wherein the first cover defines an inlet port opening into one of the cooling chambers, and an outlet port opening into another of the cooling chambers.

6. The electric machine of claim 5 wherein the inlet port is configured to connect with a passageway of a transmission housing.

7. An electric machine comprising:
   a stator including cooling channels extending between opposing ends, and end windings adjacent to the ends; and
   a cover defining a cavity and including walls partitioning the cavity into compartmentalized, circumferentially isolated cooling chambers, wherein each of the walls defines a cutout that receives a portion of a corresponding one of the end windings therein, and wherein each of the channels is in direct fluid communication with one of the chambers.

8. The electric machine of claim 7 further comprising a rotor disposed within the stator.

9. The electric machine of claim 7 wherein the stator further includes a yolk region, and wherein the cooling channels are defined by the yolk region.

10. The electric machine of claim 7 wherein the end windings are formed by windings extending through slots defined by the stator, and wherein each of the cooling channels is defined between a periphery of a corresponding one of the slots and the winding in the one of the slots.

11. The electric machine of claim 7 further comprising a second cover attached to the other of the ends and defining a second cavity having second walls partitioning the second cavity into second compartmentalized cooling chambers, wherein each of the second walls defines a cutout that receives a portion of the other of the end windings.

12. The electric machine of claim 11 wherein each of the cooling channels includes an inlet port opening into one of the covers, and an outlet port opening into the other of the covers.

13. The electric machine of claim 11 wherein each of the cooling channels is in direct fluid communication with one of the cooling chambers of the second cover.

14. The electric machine of claim 7 wherein the cover defines an inlet port and an outlet port each configured to connect with oil passageways of a transmission, and wherein the inlet port opens into one of the cooling chambers and the outlet port opens into another of the cooling chambers.

15. An electric machine comprising:
    a stator including ends and a slot extending therebetween;
    windings extending through the slot such that a cooling channel is defined between the windings and a periphery of the slot, and including end windings adjacent to the ends; and
    a cover defining a cavity receiving one of the end windings and having walls defining circumferentially isolated cooling chambers, wherein the channel is in direct fluid communication with one of the chambers.

16. The electric machine of claim 15 wherein each of the walls defines a cutout, and at least a portion of the one of the end windings is disposed within the cutout.

17. The electric machine of claim 15 wherein each of the walls further includes a first piece attached to an outer wall of the cover and a second piece attached to an inner wall.

18. The electric machine of claim 17 wherein the first and second pieces define guild members that cooperate to secure the first piece to the second piece.

19. The electric machine of claim 15 further comprising a second cover attached to the other of the ends and defining a cavity having walls partitioning the cavity into compartmentalized cooling chambers, wherein each of the walls define a cutout that receives a portion of an other of the end windings.

20. The electric machine of claim 15 further comprising a rotor disposed within the stator.

\* \* \* \* \*